United States Patent
Woodward et al.

(10) Patent No.: US 9,933,588 B2
(45) Date of Patent: Apr. 3, 2018

(54) FIBER OPTIC EQUIPMENT CHASSIS AND MODULES

(71) Applicant: Diversified Materials Specialists, Inc., Venice, FL (US)

(72) Inventors: Brandon Woodward, Venice, FL (US); Jeneth D'Alonzo, North Port, FL (US); Jeff D'Alonzo, North Port, FL (US)

(73) Assignee: Diversified Materials Specialists, Inc., Venice, FL (US)

( * ) Notice: Subject to any disclaimer, the term of this patent is extended or adjusted under 35 U.S.C. 154(b) by 0 days.

(21) Appl. No.: 15/276,557

(22) Filed: Sep. 26, 2016

(65) Prior Publication Data

US 2017/0090137 A1    Mar. 30, 2017

Related U.S. Application Data

(60) Provisional application No. 62/232,156, filed on Sep. 24, 2015.

(51) Int. Cl.
*G02B 6/44* (2006.01)

(52) U.S. Cl.
CPC ......... *G02B 6/4452* (2013.01); *G02B 6/4471* (2013.01)

(58) Field of Classification Search
CPC ............................ G02B 6/4452; G02B 6/4471
See application file for complete search history.

(56) References Cited

U.S. PATENT DOCUMENTS

| 6,418,262 B1* | 7/2002 | Puetz | G02B 6/4452 385/134 |
| 8,184,938 B2* | 5/2012 | Cooke | G02B 6/4455 385/134 |
| 8,538,227 B2* | 9/2013 | Cowen | G02B 6/4471 385/135 |

* cited by examiner

*Primary Examiner* — Ryan Lepisto
(74) *Attorney, Agent, or Firm* — Long Technology Law, LLC; Joseph L. Long

(57) ABSTRACT

Technologies are described for a fiber optic equipment chassis. The chassis may have a bottom plate and a top plate positioned such that the plates form a front chassis access and a rear chassis access. The chassis may include five module guides each having module guide channels for insertion and removal of fiber optic modules. The modules have two guide rails and movable tabs arranged in tab pairs to the front and to the rear. A tab catch on each of the tabs is configured to engage with guide catches and disengage when either tab pair is compressed toward a centerline of the module. The geometry of the modules provide a smaller total width than a distance between adjacent module guides while either pair of tabs is compressed. The smaller width can support removal of the fiber optic module from both the front access and the rear access.

7 Claims, 21 Drawing Sheets

FIBER OPTIC EQUIPMENT CHASSIS AND MODULES

CROSS-REFERENCE TO RELATED APPLICATION

This application claims the benefit of U.S. provisional patent application No. 62/232,156, filed on Sep. 24, 2015, entitled "Fiber Optic Equipment Chassis And Modules," which is expressly incorporated herein by reference in its entirety.

SUMMARY

Technologies are described herein for a fiber optic equipment chassis. The chassis may have a bottom plate and a top plate positioned such that the plates form a front chassis access and a rear chassis access. The chassis may include five module guides each having module guide channels for insertion and removal of fiber optic modules. The modules have two guide rails and movable tabs arranged in tab pairs to the front and to the rear. A tab catch on each of the tabs is configured to engage with guide catches and disengage when either tab pair is compressed toward a centerline of the module. The geometry of the modules provide a smaller total width than a distance between adjacent module guides while either pair of tabs is compressed. The smaller width can support removal of the fiber optic module from both the front access and the rear access.

It should be appreciated that the above-described subject matter may also be implemented as an apparatus, a system, an installation process, a manufacturing process, or as an article of manufacture. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
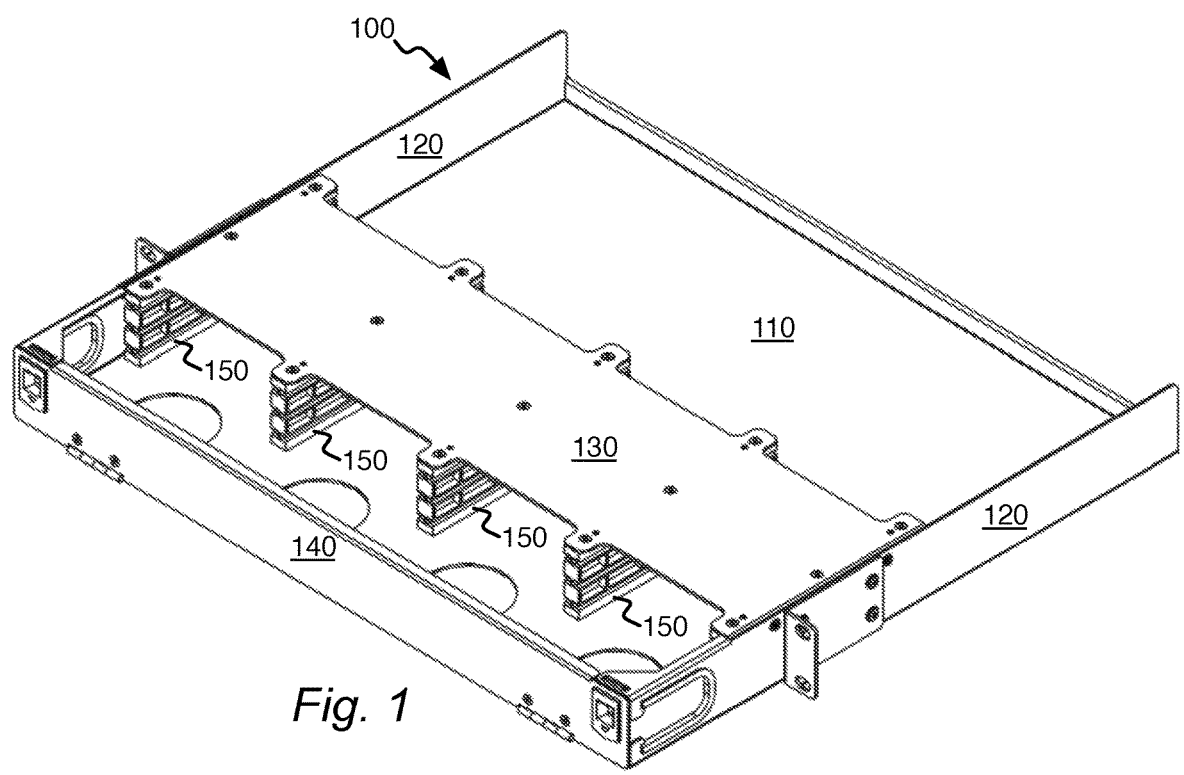
FIG. 1 is a perspective-view drawing illustrating a fiber optic equipment chassis according to one or more embodiments presented herein.

The following description is directed to technologies for fiber optic chassis and modules. In the following detailed description, references are made to the accompanying drawings that form a part hereof, and which are shown by way of illustration specific embodiments or examples. Referring now to the drawings, in which like numerals represent like, but not necessarily identical, elements through the several figures, aspects of head-mounted personal privacy solutions will be presented.

Turning first to FIG. 1, a perspective-view drawing illustrates a fiber optic equipment chassis 100 according to one or more embodiments of the technology presented herein. The fiber optic equipment chassis 100 may comprise a bottom plate 110 and a top plate 130 separated by module guides 150. The fiber optic equipment chassis 100 may comprise side panels 120. The module guides 150 can support fiber optic modules. The fiber optic equipment chassis 100 may be one rack unit (1U) high. The fiber optic equipment chassis 100 may support up to twelve (12) fiber optic modules. The fiber optic equipment chassis 100 may comprise a front access door 140 movably affixed to the one or more of the bottom plate 110, top plate 130, or side panels 120.

It should be appreciated that a height of the module guides 150 may be provided, in a modular fashion, such that the fiber optic equipment chassis 100 has a height of one rack unit (1U), two rack units (2U), three rack units (3U), or four rack units (4U).

Figure 2:
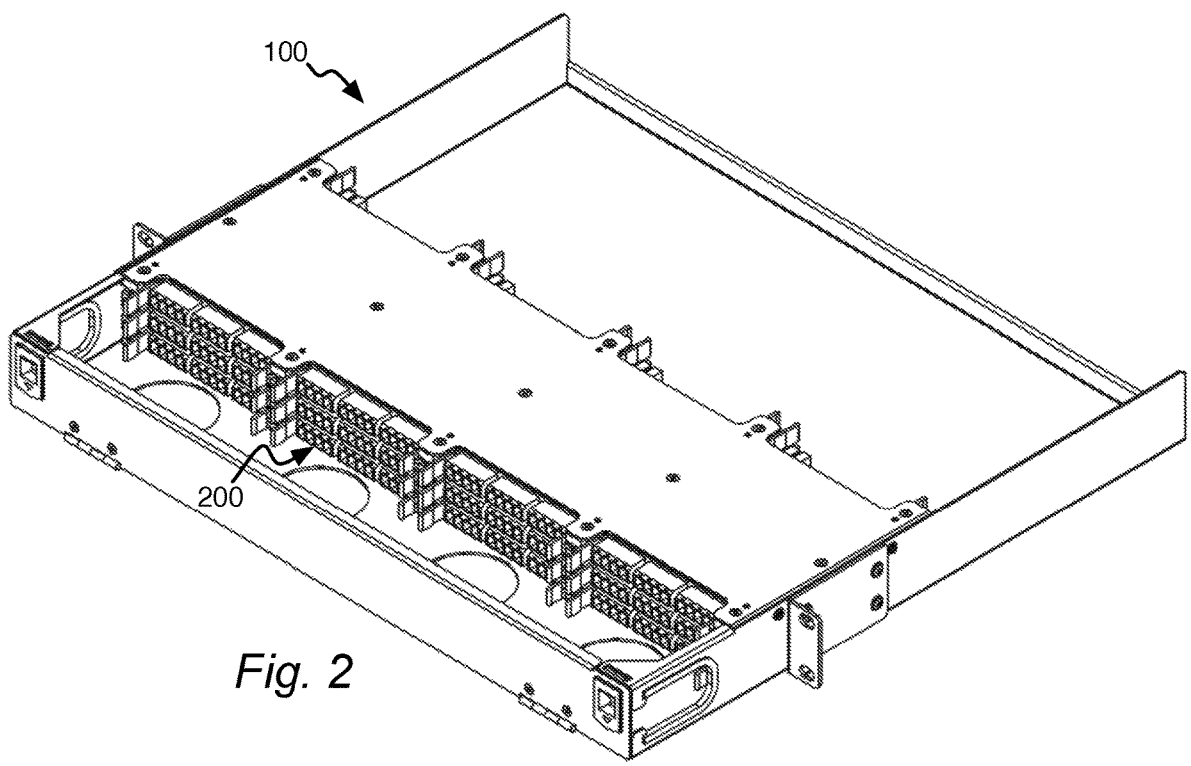
FIG. 2 is a perspective-view drawing illustrating a fiber optic equipment chassis populated with fiber optic modules according to one or more embodiments presented herein.

Referring now to FIG. 2, a perspective-view drawing illustrates a fiber optic equipment chassis 100 populated with fiber optic modules 200 according to one or more embodiments of the technology presented herein.

The fiber optic modules 200 may be inserted and/or removed from the front side of the fiber optic equipment chassis 100 (through the front access door 140). The fiber optic modules 200 may be inserted and/or removed from the rear side of the fiber optic equipment chassis 100 (opposite the front access door 140). The fiber optic modules 200 may be inserted right side up or upside down. Tabs, guides and locking features associated with the fiber optic modules 200 may all operate in the same manner or function regardless of orientation of the respective fiber optic module 200.

Figure 3:
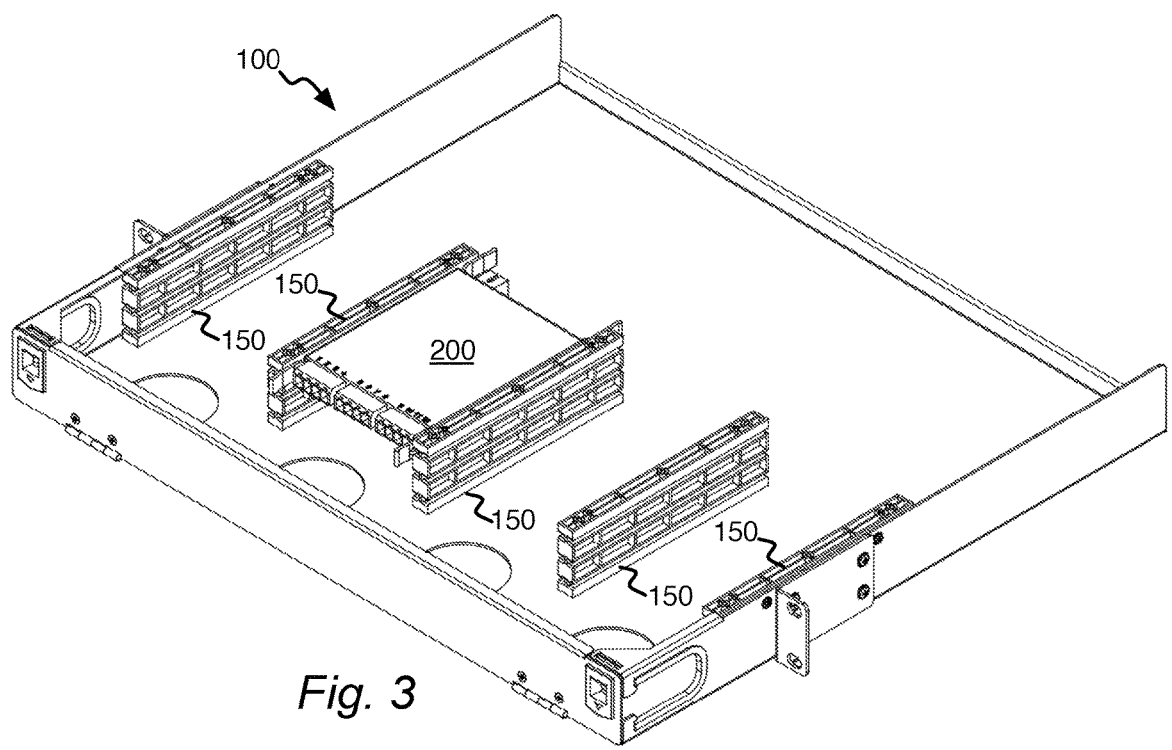
FIG. 3 is a perspective-view drawing illustrating module guides within a fiber optic equipment chassis populated with a fiber optic module according to one or more embodiments presented herein.

Referring now to FIG. 3, a perspective-view drawing illustrates module guides 150 within a fiber optic equipment chassis 100 populated with a fiber optic module 200 according to one or more embodiments of the technology presented herein.

Figure 4:
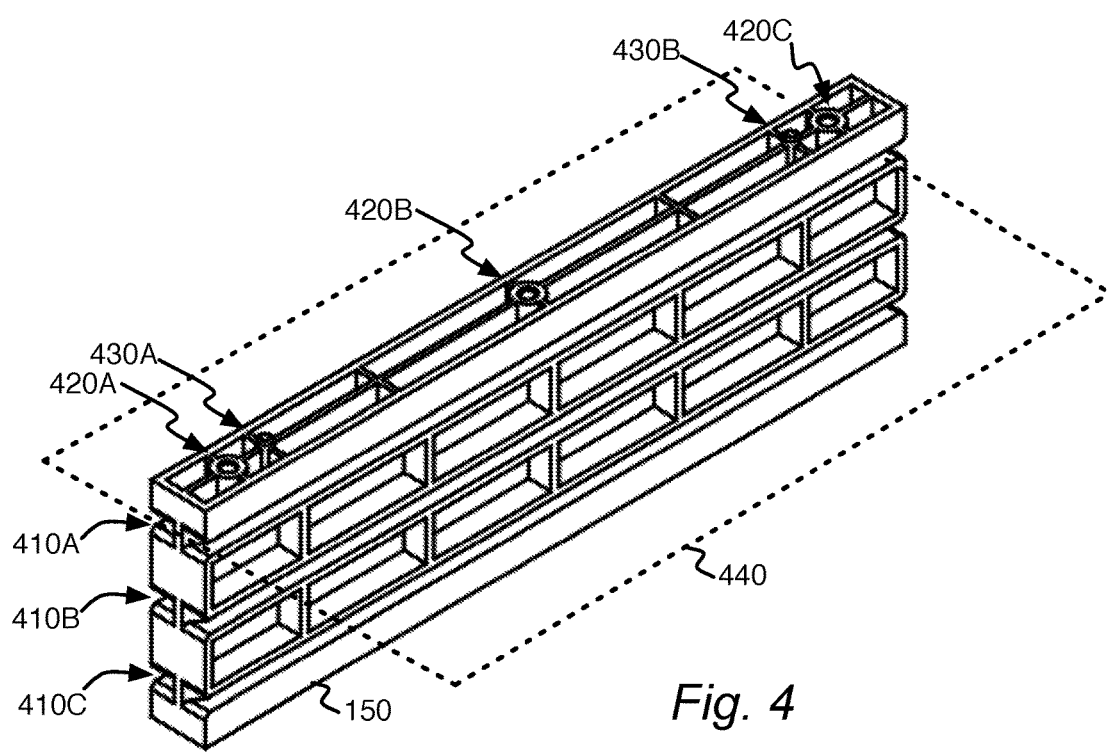
FIG. 4 is a perspective-view drawing illustrating module guides for supporting fiber optic modules according to one or more embodiments presented herein.

Referring now to FIG. 4, a perspective-view drawing illustrates module guides 150 for supporting fiber optic modules 200 according to one or more embodiments of the technology presented herein.

Mounting holes 420A-420C and alignment pins 430A-430B may be used to align and affix the module guide 150 within the fiber optic equipment chassis 100.

The channels 410A-410C may receive rails along the edge of the fiber optic modules 200 in order to support the fiber optic modules 200. The plane 400 lies within the upper channel 410A.

Figure 5:
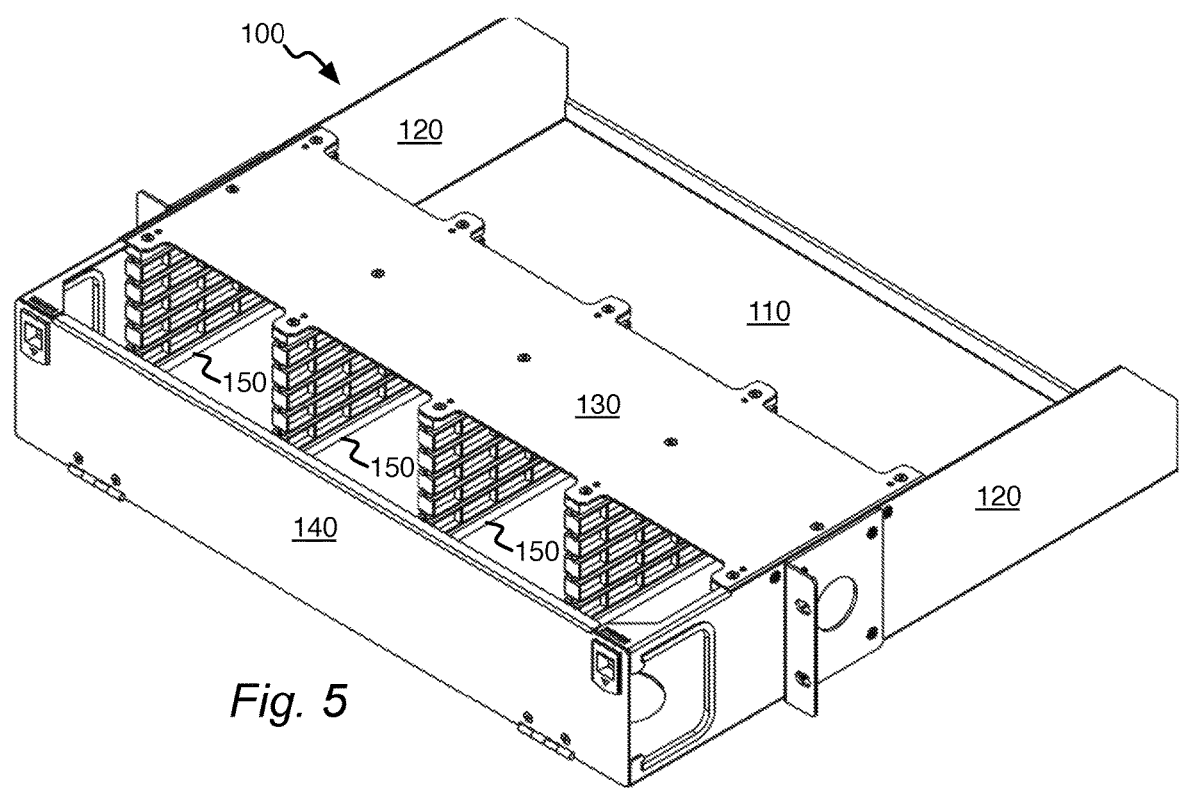
FIG. 5 is a perspective-view drawing illustrating a fiber optic equipment chassis according to one or more embodiments presented herein.

Referring now to FIG. 5, a perspective-view drawing illustrates a fiber optic equipment chassis 100 according to one or more embodiments of the technology presented herein. The fiber optic equipment chassis 100 may be two rack units (2U) high. The fiber optic equipment chassis 100 may support up to twenty-four (24) fiber optic modules 200. The fiber optic equipment chassis 100 may be modularly reconfigured between 1U and 2U configurations by changing the module guides 150, side panels 120, and the front access door 140.

Figure 6:
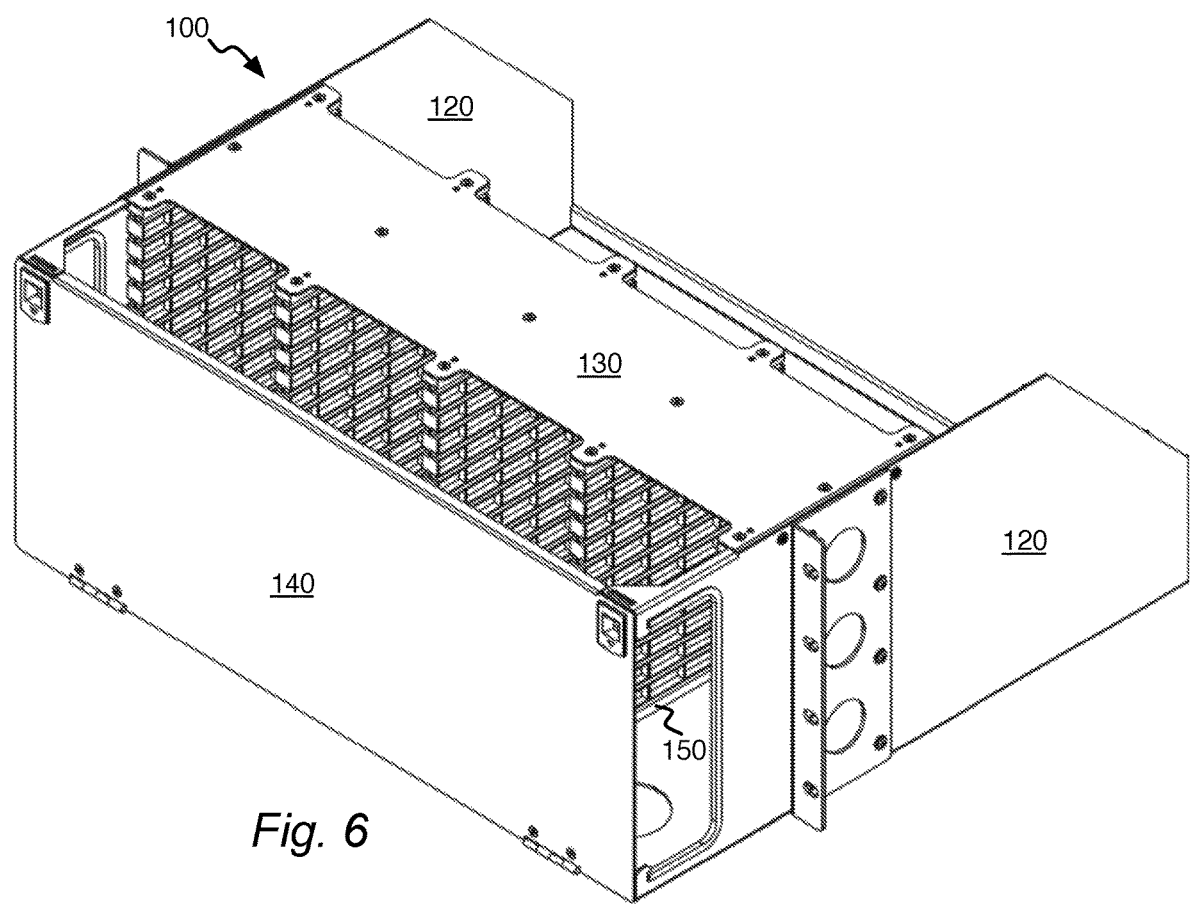
FIG. 6 is a perspective-view drawing illustrating a fiber optic equipment chassis according to one or more embodiments presented herein.

Referring now to FIG. 6, a perspective-view drawing illustrates a fiber optic equipment chassis 100 according to one or more embodiments of the technology presented herein. The fiber optic equipment chassis 100 may be four rack units (4U) high. The fiber optic equipment chassis 100 may support up to fifty-two (52) fiber optic modules 200. The fiber optic equipment chassis 100 may be modularly reconfigured between 1U, 2U, and 4U configurations by changing the module guides 150, side panels 120, and the front access door 140. It should be appreciated that each column of fiber optic modules 200 within the fiber optic equipment chassis 100 can accommodate thirteen (13) fiber optic modules 200.

Figure 7:
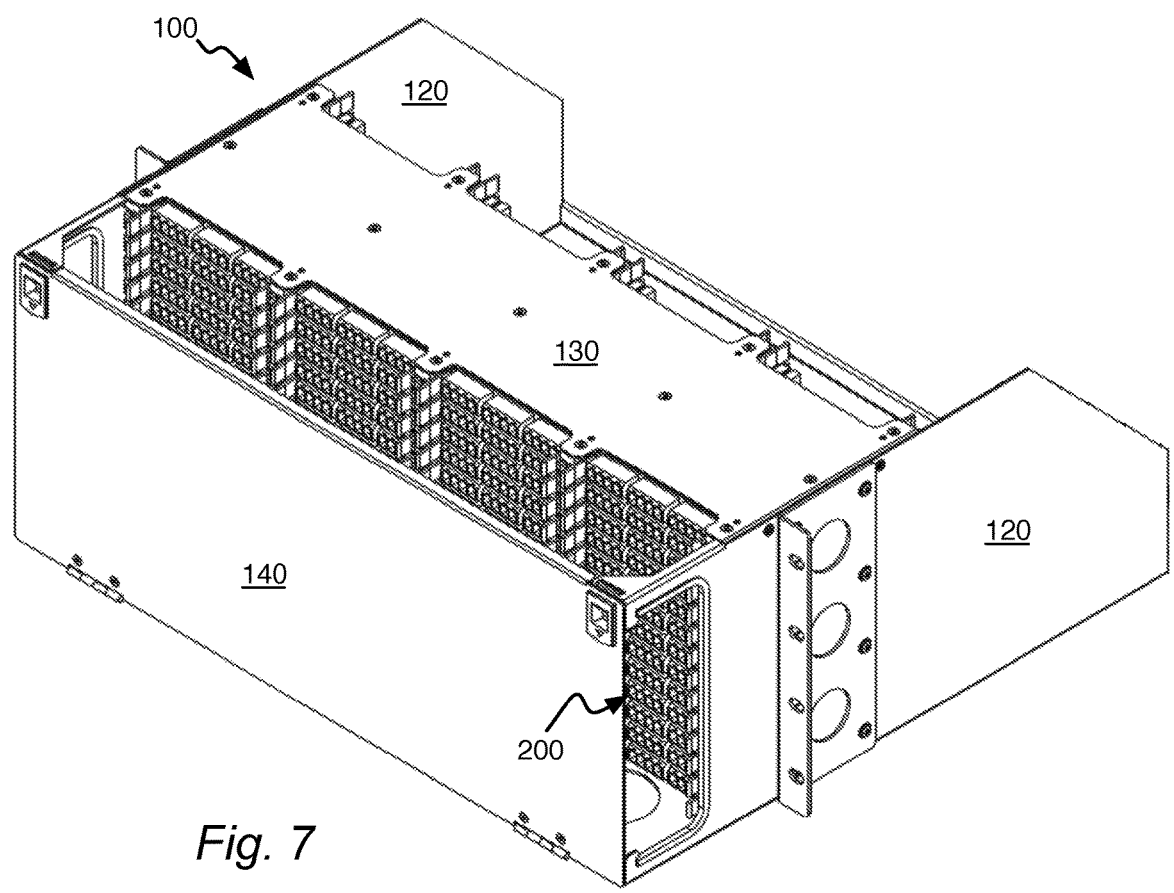
FIG. 7 is a perspective-view drawing illustrating a fiber optic equipment chassis populated with fifty-two fiber optic modules according to one or more embodiments presented herein.

Referring now to FIG. 7, a perspective-view drawing illustrates a fiber optic equipment chassis 100 populated with fifty-two (52) fiber optic modules 200 according to one or more embodiments of the technology presented herein.

It should be appreciated that the fiber optic modules 200 may alternatively be mounted vertically (sideways) within the fiber optic equipment chassis 100.

Figure 8:
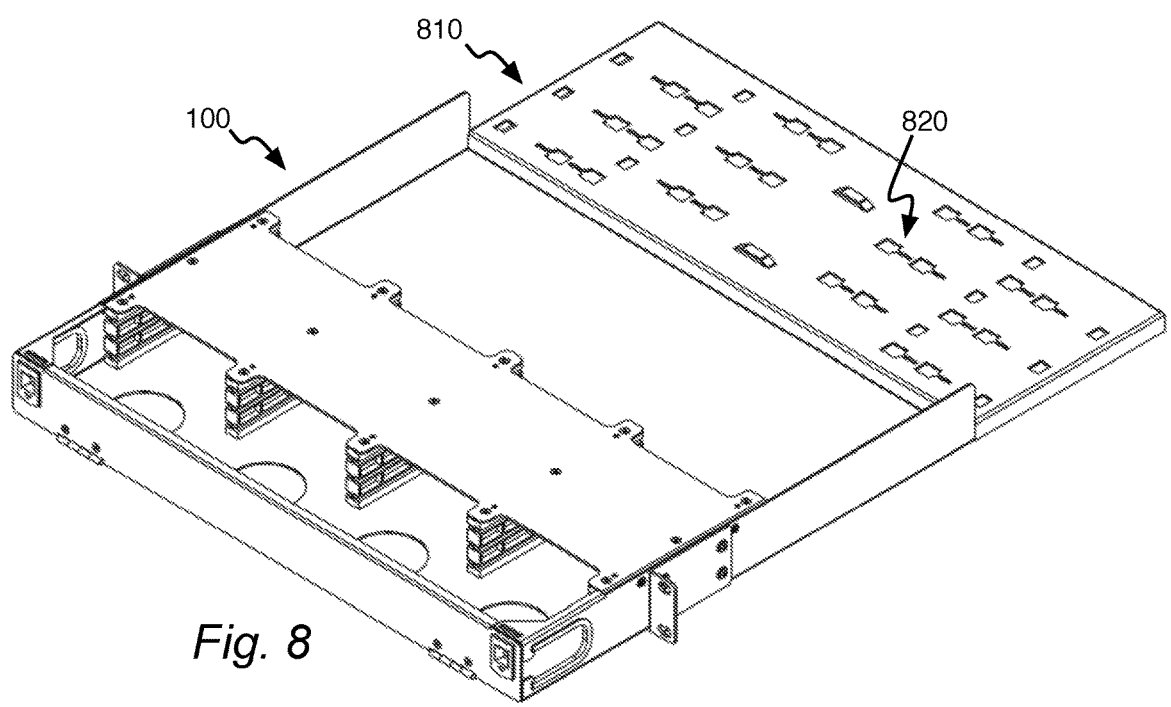
FIG. 8 is perspective-view drawing illustrating a fiber optic equipment chassis comprising a rear cable management platform according to one or more embodiments presented herein.

Referring now to FIG. 8, a perspective-view drawing illustrates a fiber optic equipment chassis 100 comprising a rear cable management platform 810 according to one or more embodiments of the technology presented herein. The rear cable management platform 810 may include mounting holes 820. The mounting holes 820 may be configured to support cable ties, cable supports, cable furcation modules, or other cable management structures.

Figure 9:
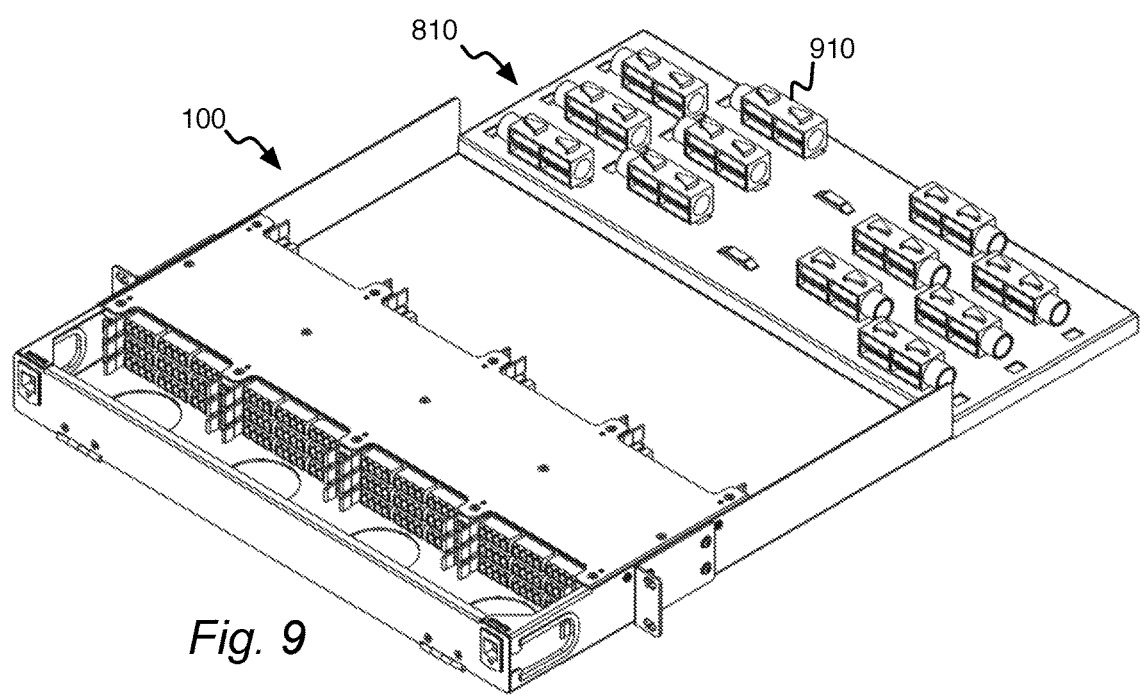
FIG. 9 is a perspective-view drawing illustrating a fiber optic equipment chassis comprising a rear cable management platform supporting furcation modules according to one or more embodiments presented herein.

Referring now to FIG. 9, a perspective-view drawing illustrates a fiber optic equipment chassis 100 comprising a rear cable management platform 810 supporting furcation modules 910 according to one or more embodiments of the technology presented herein.

Figure 10:
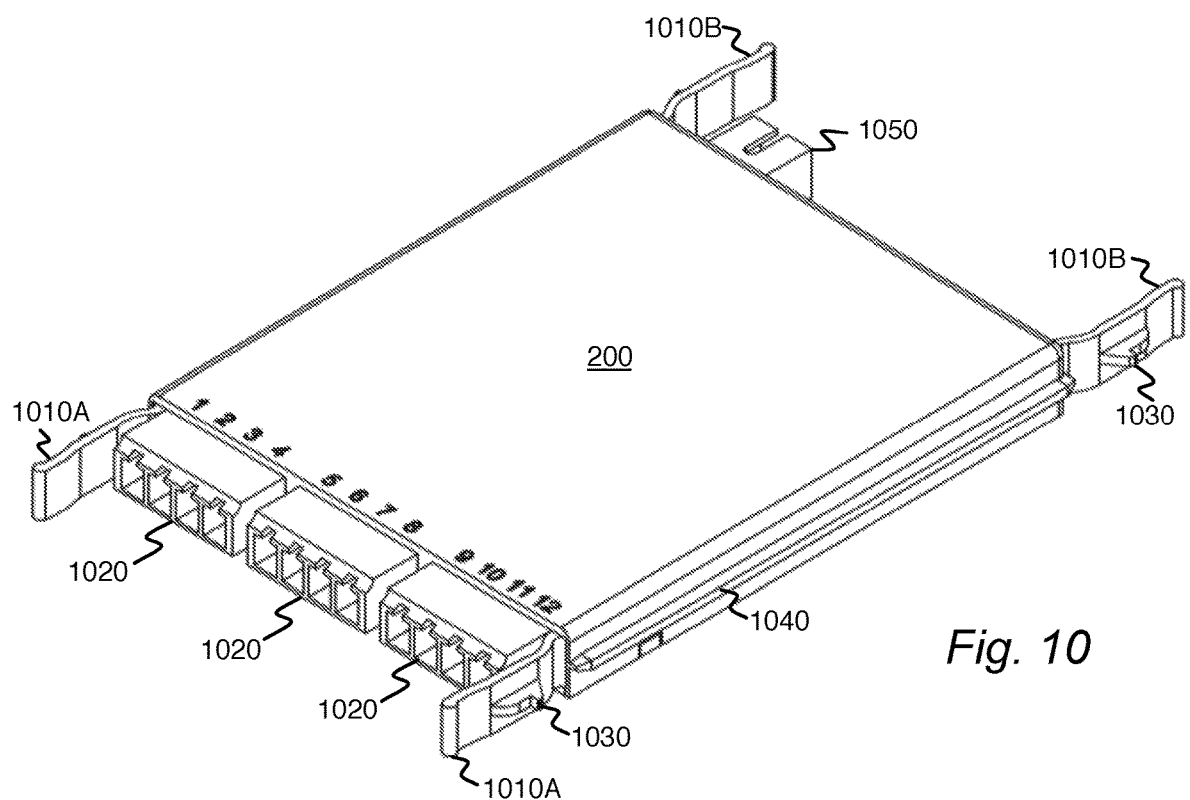
FIG. 10 is a perspective-view drawing illustrating a fiber optic module according to one or more embodiments presented herein.

Referring now to FIG. 10, a perspective-view drawing illustrates a fiber optic module 200 according to one or more embodiments of the technology presented herein.

The fiber optic module 200 may include integrated guide rails 1040, front tabs 1010A, and rear tabs 1010B. The guide rails 1040 can run substantially the full length of the fiber optic module 200. The guide rails 1040 can slide within the channels 410A-410C located within the module guides 150 in order to support the fiber optic module 200. The front tabs 1010A and the rear tabs 1010B may extend out from the front or rear of the fiber of the fiber optic module 200. To unlock and remove the fiber optic module 200 from the channels 410 the tabs 1010 may be pressed inward to deactivate a module tab catch 1030 from a mating channel catch within the channels 410 of the module guides 150. The optic module 200 can be installed right side up, upside down, from front, or from the rear. The guide rails 1040 and the tabs 1010 may be integrated into a unibody housing associated with the fiber optic module 200. For example, the unibody housing may be molded or machined as a single element.

The fiber optic module 200 can house a fiber optical assembly that couples fiber optical wave guides between one or more rear fiber optical couplers 1050 and one or more forward fiber optical couplers 1020. For example, the fiber optic module 200 may comprise a single rear fiber optical coupler 1050 that is a multi-fiber connector such as those using multi-fiber push on (MPO) or MTP technology. For example, the multi-fiber connector may include twelve (12) or more fiber optic waveguides within a single connector. The internal fiber optical assembly may then break the twelve (12) or more fiber optic waveguides out to the separate forward fiber optical couplers 1020, which in the illustrated example may be twelve (12) LC couplers.

The forward fiber optical couplers 1020 and rear fiber optical couplers 1050 may also be referred to as adapters, connectors, guides, or other fiber optic waveguide coupling terminology. The forward fiber optical couplers 1020 and rear fiber optical couplers 1050 may support various type of fiber optical connectors, such as MTP, MPO, SFF, LC, MT-RJ, ST, SC, FC, and so forth. The connectors may also be any combination of simplex or duplex arrangements.

Figure 11:
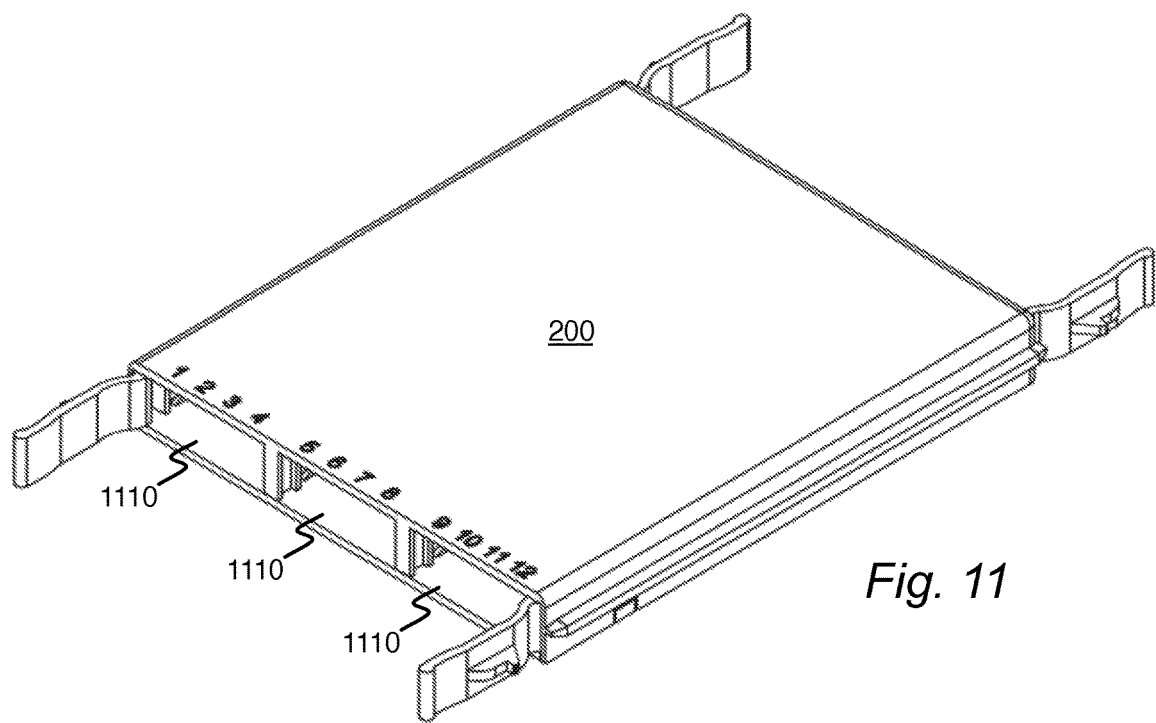
FIG. 11 is a perspective-view drawing illustrating a fiber optic module without forward fiber optical couplers according to one or more embodiments presented herein.

Referring now to FIG. 11, a perspective-view drawing illustrates a fiber optic module 200 without forward fiber optical couplers 1020 according to one or more embodiments of the technology presented herein. The openings 1110 within the front surface of the fiber optic module 200 can support the installation of up to three (3) forward fiber optical couplers 1020. The openings 1110 within the front surface of the fiber optic module 200 may be referred to as rear ports.

Figure 12:
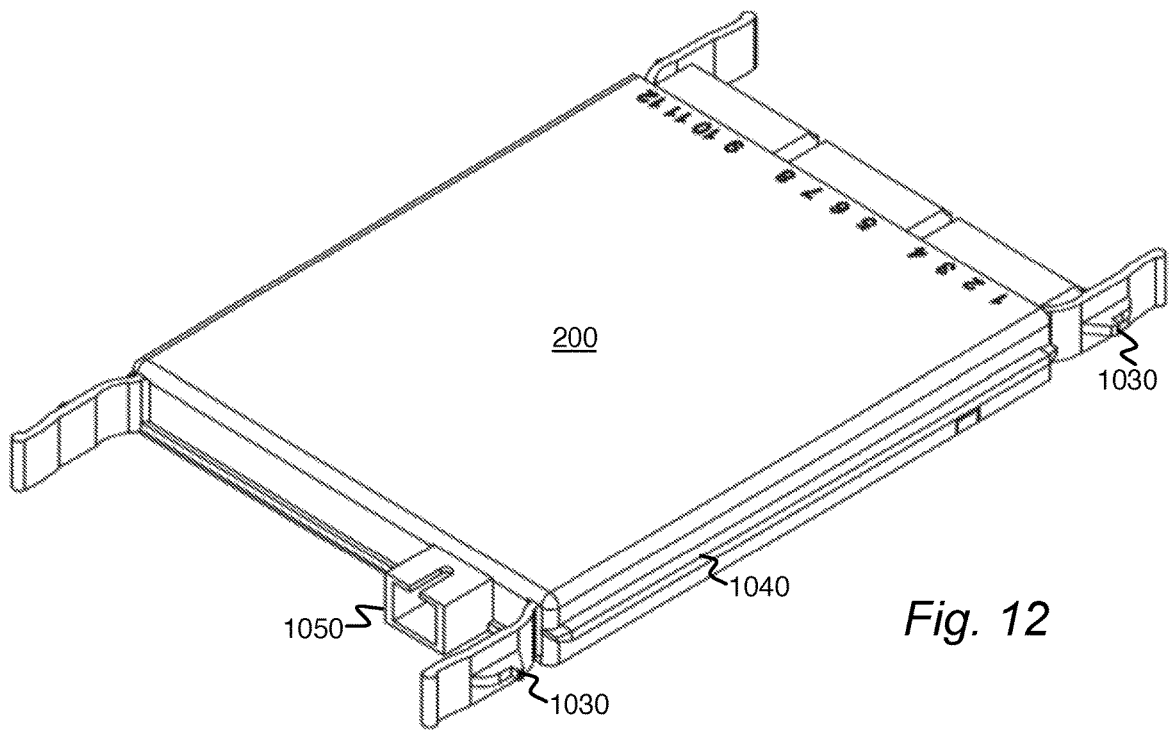
FIG. 12 is a perspective-view drawing illustrating a rear-view of a fiber optic module according to one or more embodiments presented herein.

Referring now to FIG. 12, a perspective-view drawing illustrates a rear-view of a fiber optic module 200 according to one or more embodiments of the technology presented herein.

Figure 13:
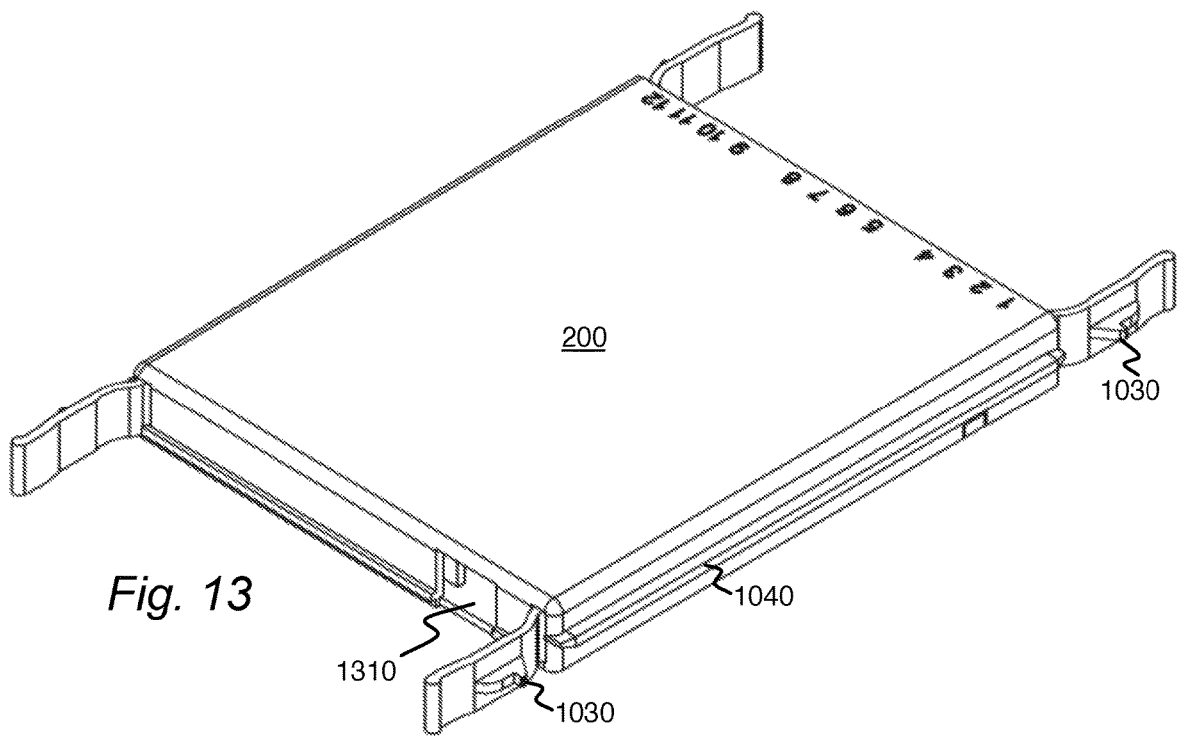
FIG. 13 is a perspective-view drawing illustrating a rear-view of a fiber optic module without a rear fiber optical coupler according to one or more embodiments presented herein.

Referring now to FIG. 13, a perspective-view drawing illustrates a rear-view of a fiber optic module 200 without a rear fiber optical coupler 1050 according to one or more embodiments of the technology presented herein. The opening 1310 within the rear surface of the fiber optic module 200 can support the installation of a rear fiber optical coupler 1050. The opening 1310 within the rear surface of the fiber optic module 200 may be referred to as a rear port.

Figure 14:
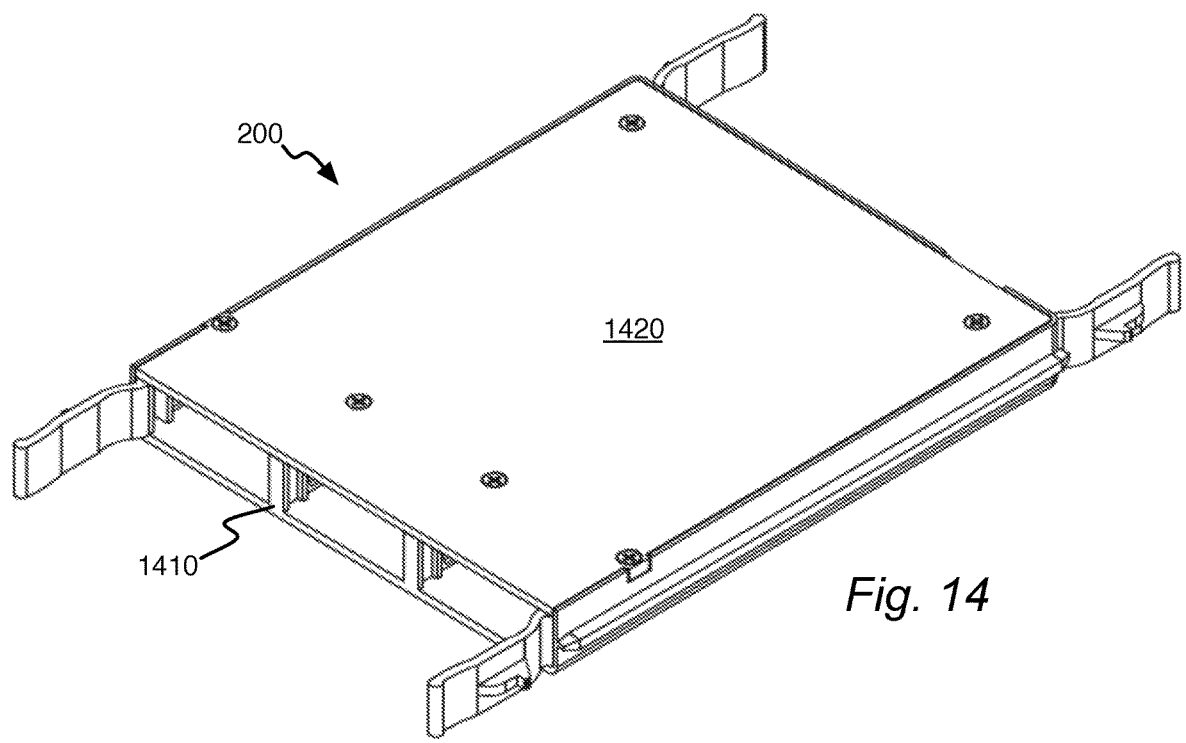
FIG. 14 is a perspective-view drawing illustrating a bottom-view of a fiber optic module according to one or more embodiments presented herein.

Referring now to FIG. 14, a perspective-view drawing illustrates a bottom-view of a fiber optic module 200 according to one or more embodiments of the technology presented herein.

The housing of the fiber optic module 200 can be molded as a module housing element 1410 that incorporates the module guides 150, the front tabs 1010A, the rear tabs 1010B, and the associated module tab catches 1030. A module cover 1420 may be attached to the module housing element 1410 to enclose the fiber optic module 200 and protect the fiber optical assembly within. The module cover 1420 may be attached to the module housing element 1410 using screws (as illustrated), rivets, snaps, adhesive, welding, pressure fitting, or so forth.

Figure 15:
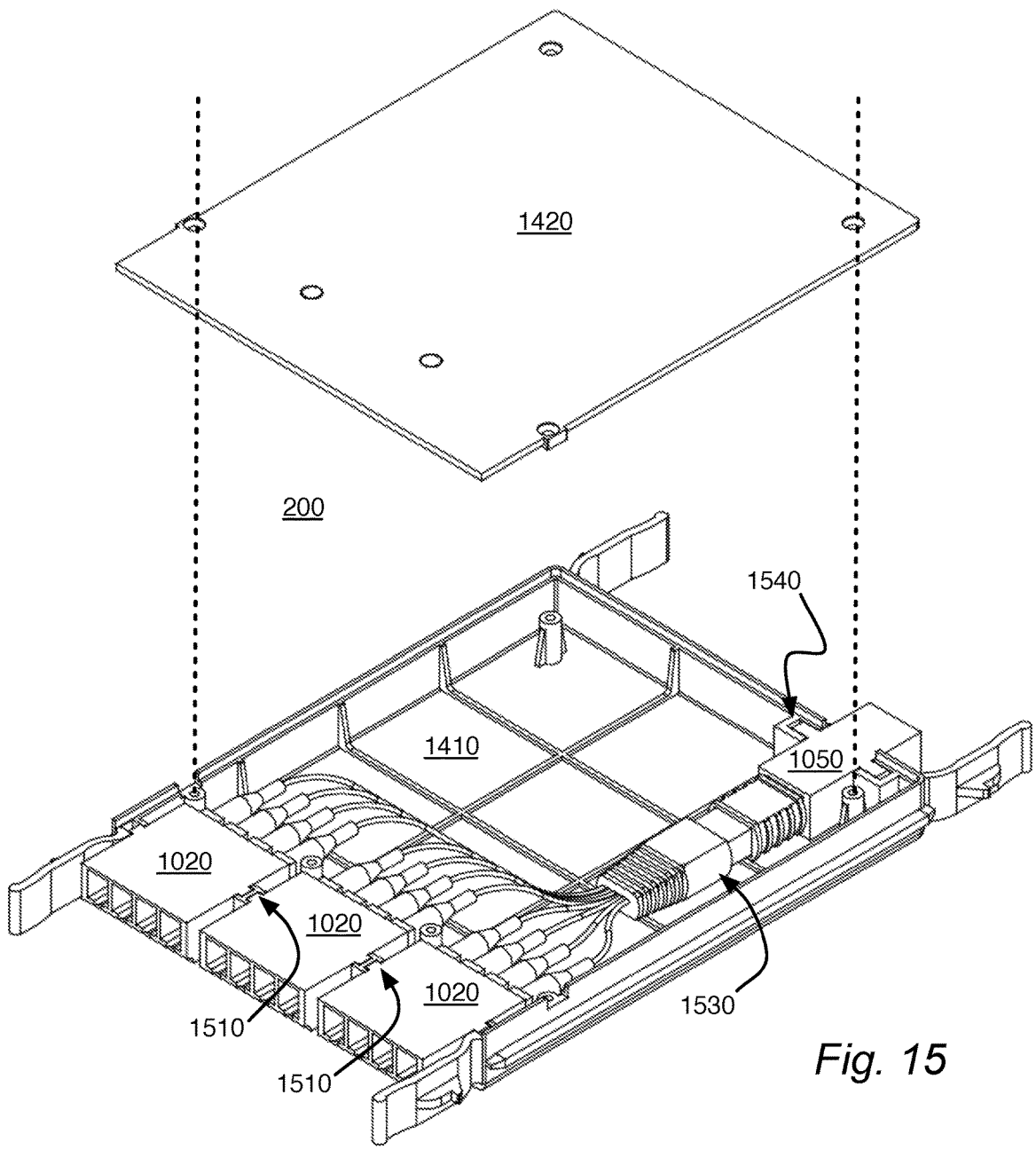
FIG. 15 is an exploded-view drawing illustrating an interior of a fiber optic module according to one or more embodiments presented herein.

Referring now to FIG. 15, an exploded-view drawing illustrates an interior of a fiber optic module 200 according to one or more embodiments of the technology presented herein.

A fiber optical assembly 1530 within the fiber optic module 200 may be used to couple fiber optical waveguides between one or more rear fiber optical couplers 1050 and one or more forward fiber optical couplers 1020.

Forward coupler retainers 1510 may provide pockets for retaining tabs protruding from the sides of the forward fiber optical couplers 1020. The forward coupler retainers 1510 may have the shape of an "I beam" to provide a pocket on each side for simultaneously retaining two forward fiber optical couplers 1020. The forward coupler retainers 1510 may be molded as part of the module housing element 1410. The forward fiber optical couplers 1020 may float within the forward coupler retainers 1510 such that the forward fiber optical couplers 1020 are retained into pockets of the forward coupler retainers 1510 once the module cover 1420 is attached to the module housing element 1410.

A rear coupler retainer 1540 may provide pockets for retaining tabs protruding from the sides of the rear fiber optical coupler 1050. The rear coupler retainer 1540 may have a substantially C-shape to provide pockets on each side for retaining the rear fiber optical coupler 1050. The rear coupler retainer 1540 may be molded as part of the module housing element 1410. The rear fiber optical coupler 1050 may float within the rear coupler retainer 1540 such that the rear fiber optical coupler 1050 is retained into the pockets of the rear coupler retainer 1540 once the module cover 1420 is attached to the module housing element 1410.

Alternatively, the outer portion of the forward fiber optical couplers 1020 and/or the rear fiber optical coupler 1050 may be molded as part of the module housing element 1410. Fiber ferule alignment sleeves, similar to those in traditional couplers (such as 1020 and/or 1050) may be installed within the mold integrated couplers of the module housing element 1410.

Figure 16:
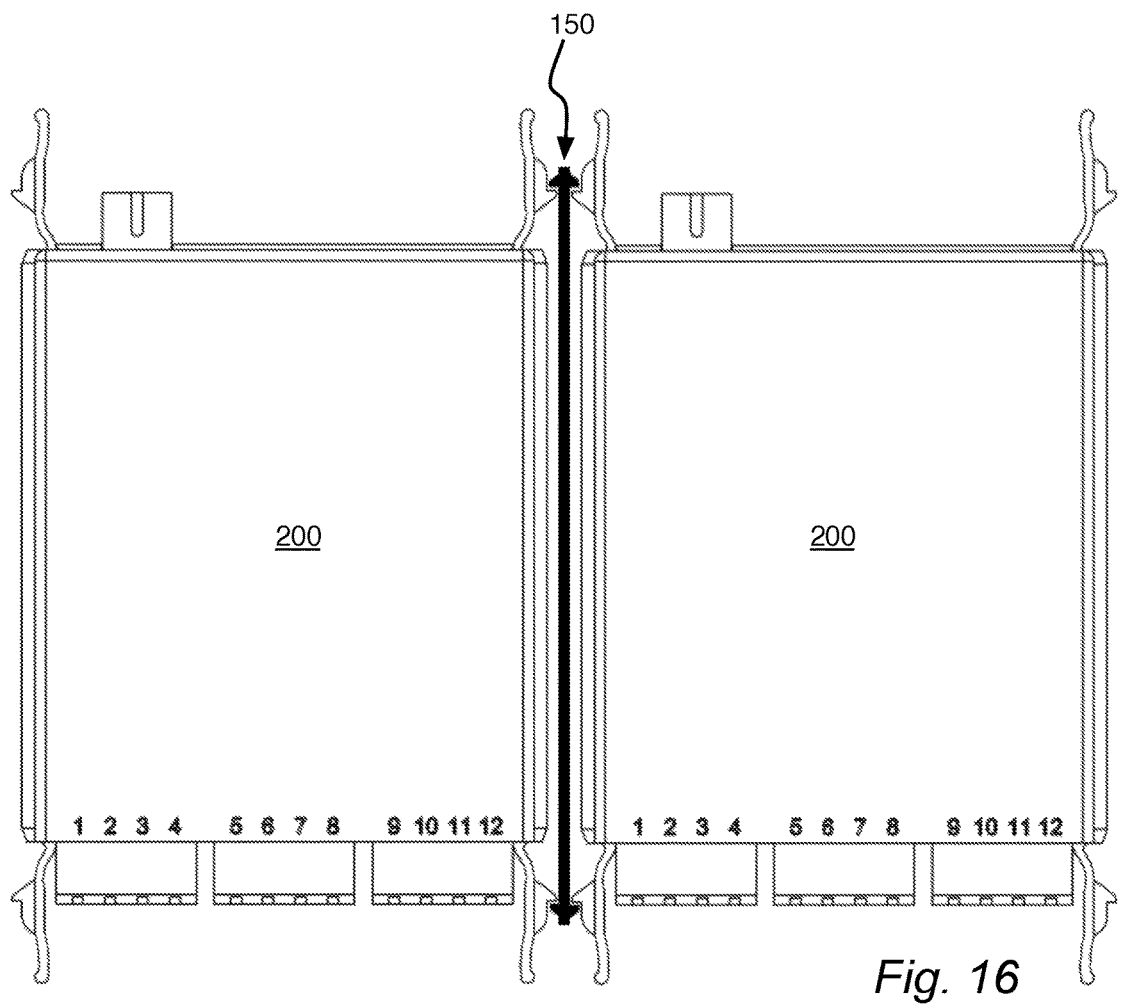
FIG. 16 is a top-view drawing illustrating two fiber optic modules engaged with a cut away portion of a module guide according to one or more embodiments presented herein.

Referring now to FIG. 16, a top-view drawing illustrates two fiber optic modules 200 engaged with a cut away portion of a module guide 150 according to one or more embodiments of the technology presented herein. The cut away view is located along plane 400 within a channel 410 of the module guide 150 for supporting the fiber optic modules 200.

The fiber optic modules 200 may be extracted through the front side or the rear side with respect to the module guides 150 within the fiber optic equipment chassis 100. To unlock and remove the fiber optic module 200 from the channels 410, the tabs 1010 may be pressed inward to deactivate a module tab catch 1030 from a mating channel catch within the channels 410 of the module guides 150.

To support pass-through extraction of the fiber optic module 200 through either the front side or the rear side of the fiber optic equipment chassis 100, the guide rails 1040 and the module tab catch 1030 on the interior of the tabs 1010 are all within the linear path of the channels 410 located within the module guides 150. The tabs are also out of the way of the module guides 150 and the fiber optic modules 200 above and below, such that the tabs 1010 on the opposite side of the fiber optic module 200 can pass through the space previously occupied by the fiber optic module 200 while it is being extracted.

Figure 17:
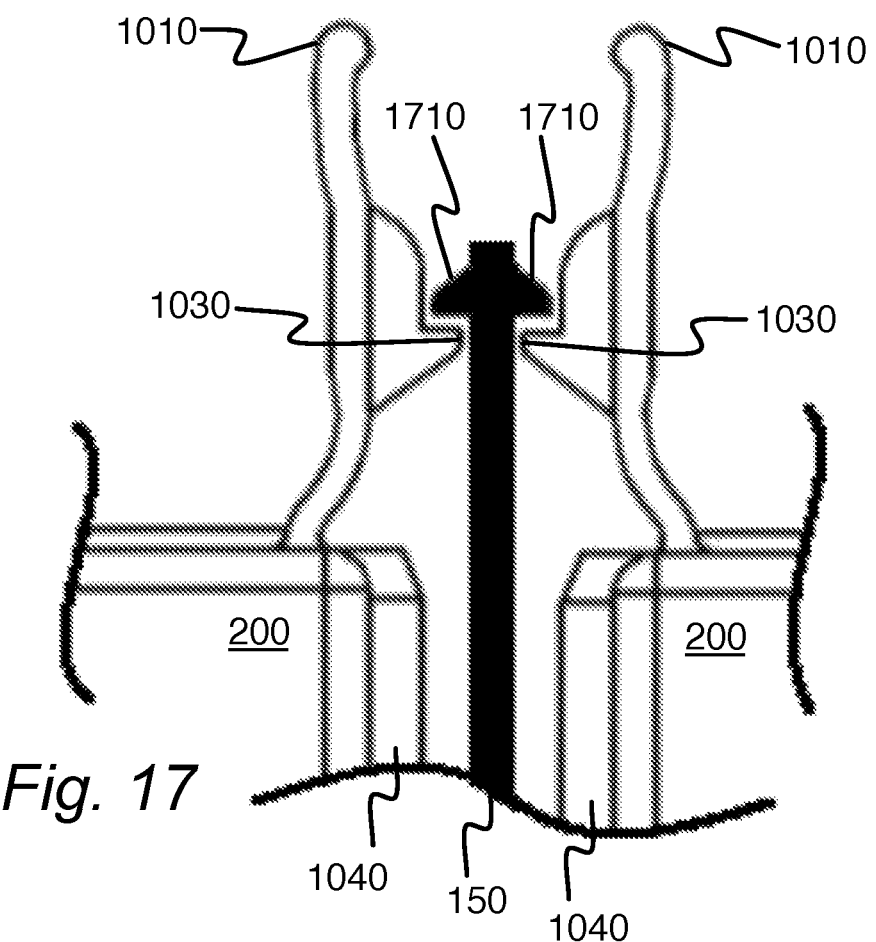
FIG. 17 is a detail-view drawing illustrating module tab catches associated with module tabs engaging with corresponding module guide catches associated with module guides according to one or more embodiments presented herein.

Referring now to FIG. 17, a detail-view drawing illustrates module tab catches 1030 associated with module tabs 1010 engaging with corresponding module guide catches 1710 associated with module guides 150 according to one or more embodiments of the technology presented herein.

Figure 18:
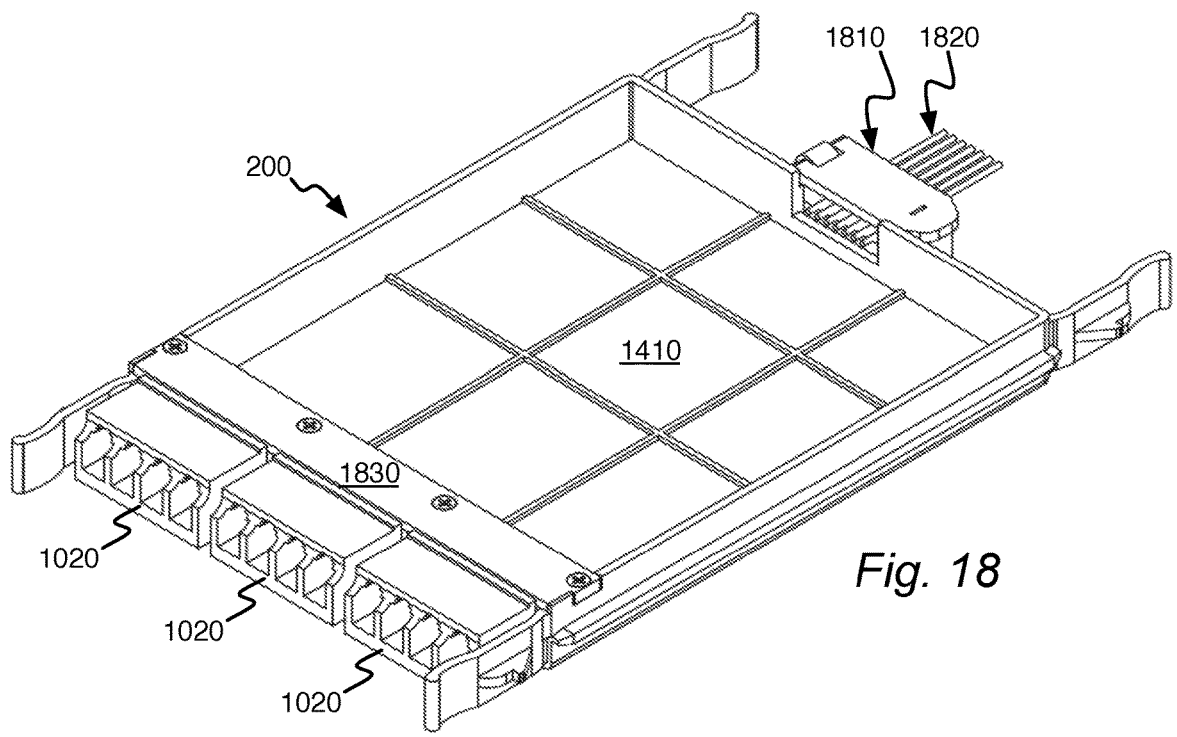
FIG. 18 is a perspective-view drawing illustrating a fiber optic module configured to support fiber patching according to one or more embodiments presented herein.

Referring now to FIG. 18, a perspective-view drawing illustrates a fiber optic module 200 configured to support fiber patching according to one or more embodiments of the technology presented herein.

According to the fiber patch (or fiber pass-through) configuration of the fiber optic module 200, rear entry fibers 1820 may pass through from the rear of the fiber optic module 200 to the forward fiber optical couplers 1020 for attachment. In such a configuration, the rear entry fibers 1820 may be held into place at the rear of the fiber optic module 200 by a relief gripper 1810 instead of coupling into a rear fiber optical coupler 1050. Such a configuration can reduce the cost and the coupling loss associated with the rear fiber optical coupler 1050.

The forward fiber optical couplers 1020 could support any type of fiber optical couplers including up to six (6) MTP connectors per fiber optic module 200. With each of those MTP connector supporting up to 72 fiber optic waveguides, the density per module can be enormous.

Figure 19:
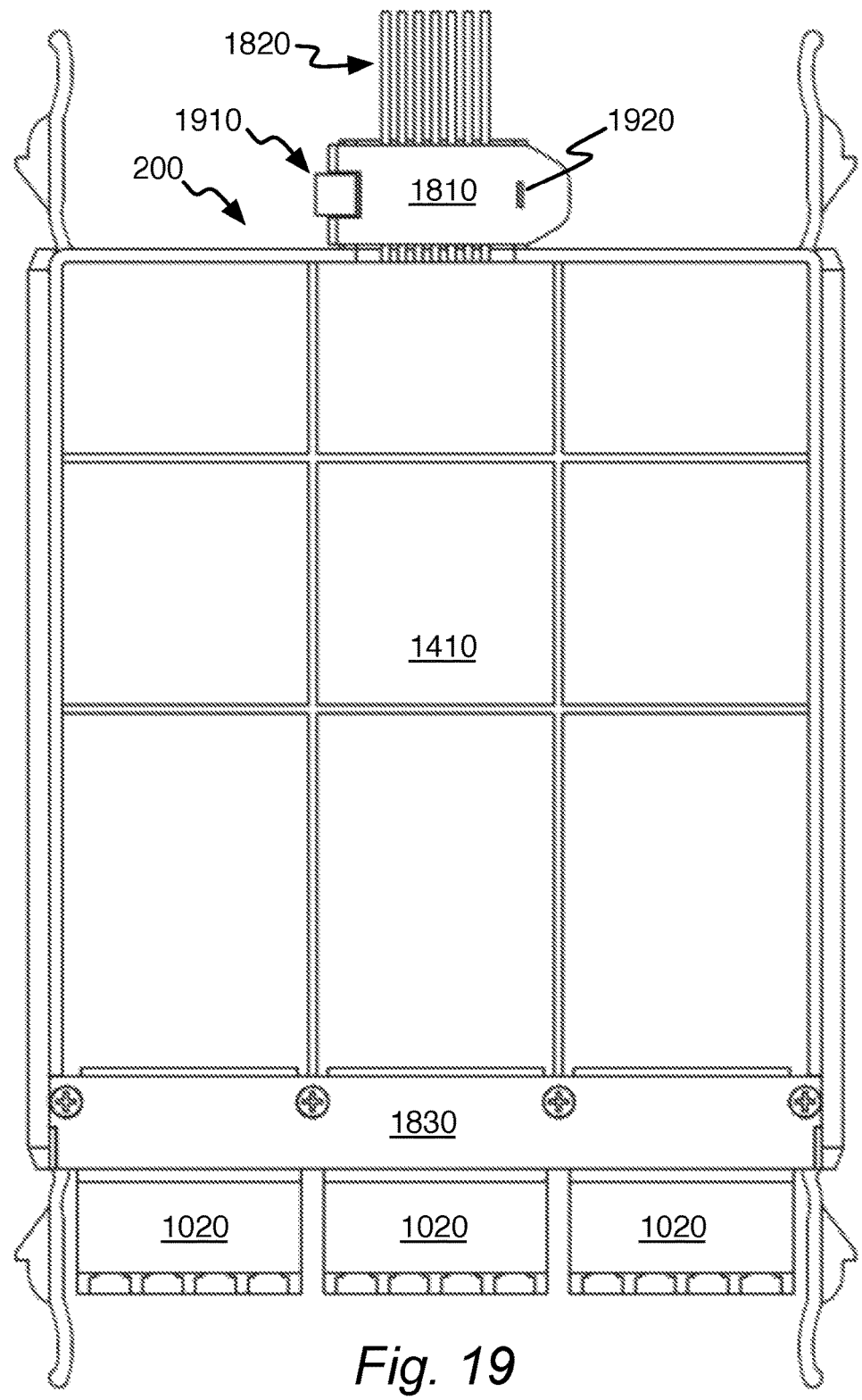
FIG. 19 is a top-view drawing illustrating a fiber optic module configured to support fiber patching according to one or more embodiments presented herein.

Referring now to FIG. 19, a top-view drawing illustrates a fiber optic module 200 configured to support fiber patching according to one or more embodiments of the technology presented herein.

The rear entry fibers 1820 may be held into place at the rear of the fiber optic module 200 by a relief gripper 1810. The relief gripper 1810 may be affixed by a gripper pivot 1910 on one side and a gripper latch 1920 on the other side.

Figure 20:
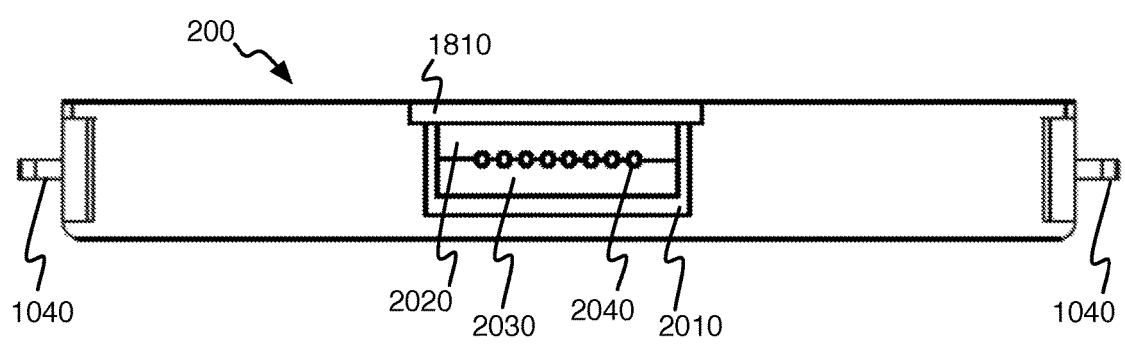
FIG. 20 is a rear-view drawing illustrating a fiber optic module configured to support fiber patching with a closed relief gripper according to one or more embodiments presented herein.

Referring now to FIG. 20, a rear-view drawing illustrates a fiber optic module 200 configured to support fiber patching with a closed relief gripper 1810 according to one or more embodiments of the technology presented herein.

When closed, the relief gripper 1810 can engage with a lower gripper frame 2010 to press an upper gripper jaw 2020 against a lower gripper jaw 2030. The upper gripper jaw 2020 and/or the lower gripper jaw 2030 may include one or more gripper channels 2040 through which the rear entry fibers 1820 may pass through while their jackets are gently gripped into position. Alternatively, the upper gripper jaw 2020 and/or the lower gripper jaw 2030 may comprise soft or deformable material (such as foam or rubber) to allow the rear entry fibers 1820 to pass through while being gently gripped into position.

Figure 21:
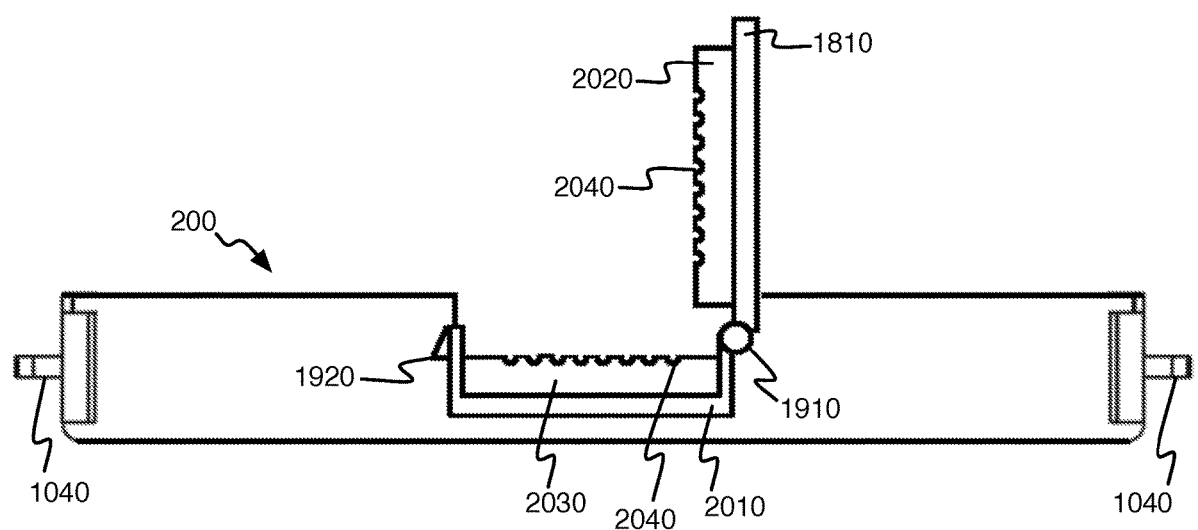
FIG. 21 is a rear-view drawing illustrating a fiber optic module configured to support fiber patching with an open relief gripper according to one or more embodiments presented herein.

Referring now to FIG. 21, a rear-view drawing illustrates a fiber optic module 200 configured to support fiber patching with an open relief gripper 1810 according to one or more embodiments of the technology presented herein. The relief gripper 1810 may be affixed by a gripper pivot 1910 on one side and a gripper latch 1920 on the other side. According to certain embodiments the gripper latch 1920 may comprise a resealable snap closure.

Based on the foregoing, it should be appreciated that technologies for fiber optic chassis and modules are presented herein. Although the subject matter presented herein has been described in specific language related to structural features or methodological acts, it is to be understood that the invention defined in the appended claims is not necessarily limited to the specific features or acts described herein. Rather, the specific features and acts are disclosed as example forms of implementation.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A fiber optic module system comprising:
   one or more front ports supporting up to three forward fiber optical couplers;
   a rear port supporting a rear fiber optical coupler;
   two module guide rails extending from the sides of the fiber optic module and configured to slide within module guide channels disposed within module guides of a fiber optic equipment chassis;
   four movable module tabs arranged in two tab pairs, a first tab pair extending from the front of the fiber optic module and a second tab pair extending from the rear of the fiber optic module;
   a module tab catch positioned on each of the four movable module tabs and configured to engage with module guide catches disposed within either end of each of the module guide channels and to disengage from the module guide catches when a respective tab pair is compressed toward a centerline of the fiber optic module; and
   a geometry supporting a smaller width than a distance between adjacent module guides while either of the respective tab pairs is compressed, the smaller width supporting removal of the fiber optic module from both a front access and a rear access of said fiber optic equipment chassis.

2. The fiber optic module system of claim 1, wherein the forward fiber optical couplers are twelve LC couplers.

3. The fiber optic module system of claim 1, wherein the rear fiber optical coupler is a multi-fiber connector.

4. The fiber optic module system of claim 1, further comprising a fiber optical assembly that couples fiber optical wave guides between the forward fiber optical couplers and the rear fiber optical coupler.

5. The fiber optic module system of claim 1, further comprising a relief gripper at the rear port configured to provide a strain relief to fiber optical wave guides passing through the rear of the fiber optic module to couple with the forward fiber optical couplers.

6. The fiber optic module system of claim 1, further comprising a relief gripper at the rear port, the relief gripper comprising a resealable snap closure.

7. The fiber optic module system of claim 1, further comprising a relief gripper at the rear port, the relief gripper comprising a gripper pivot to support opening and closing of the relief gripper.

\* \* \* \* \*